(12) United States Patent
Grivna et al.

(10) Patent No.: US 7,016,430 B1
(45) Date of Patent: Mar. 21, 2006

(54) APPARATUS AND PROTOCOL FOR EXCEPTION PROPAGATION IN SERIAL TRANSPORT BLOCK CODED INTERFACES

(75) Inventors: Edward L. Grivna, Brooklyn Park, MN (US); Michael F. Maas, Mendota Heights, MN (US)

(73) Assignee: Cyrpess Semiconductor Corp., San Jose, CA (US)

( * ) Notice: Subject to any disclaimer, the term of this patent is extended or adjusted under 35 U.S.C. 154(b) by 700 days.

(21) Appl. No.: 09/814,194

(22) Filed: Mar. 21, 2001

(51) Int. Cl.
*H04B 15/00* (2006.01)

(52) U.S. Cl. ............... 375/285; 370/252; 714/752; 714/758; 714/746; 714/786

(58) Field of Classification Search ............... 375/222, 375/340, 330, 240.2, 240.1, 232, 368, 239, 375/285, 130, 292, 214, 224, 348; 714/703, 714/758, 43, 11, 244, 38, 746, 752, 786; 455/324; 370/335, 146.2, 498, 245, 241, 370/242, 445, 252; 178/3; 712/244
See application file for complete search history.

(56) References Cited

U.S. PATENT DOCUMENTS

| | | | |
|---|---|---|---|
| 3,646,517 A | 2/1972 | Waters et al. | 340/146.1 |
| 3,893,072 A | 7/1975 | D'Antonio et al. | 340/146.1 |
| 4,903,270 A | 2/1990 | Johnson et al. | 371/68.1 |
| 5,001,712 A | 3/1991 | Splett et al. | 371/3 |
| 5,195,093 A * | 3/1993 | Tarrab et al. | 714/703 |
| 5,872,910 A | 2/1999 | Kuslak et al. | 395/183.17 |
| 5,881,280 A * | 3/1999 | Gupta et al. | 712/244 |
| 5,946,300 A | 8/1999 | Wilbrod | 370/241 |
| 5,949,799 A | 9/1999 | Grivna et al. | 371/33 |
| 6,170,073 B1 | 1/2001 | Jarvinen et al. | 714/758 |
| 6,173,423 B1 | 1/2001 | Autechaud et al. | 714/703 |
| 6,182,248 B1 | 1/2001 | Armstrong et al. | 714/43 |
| 6,188,702 B1 | 2/2001 | Tornetta et al. | 370/535 |
| 6,226,269 B1 * | 5/2001 | Brewer et al. | 370/245 |
| 6,233,073 B1 | 5/2001 | Bowers et al. | 359/110 |
| 6,295,010 B1 | 9/2001 | Thiesfeld | 341/58 |
| 6,304,984 B1 | 10/2001 | Neal et al. | 714/57 |
| 6,370,667 B1 * | 4/2002 | Maki | 714/758 |

OTHER PUBLICATIONS

Edward L. Grivna, et al., "Apparatus and Protocol for Detected Error Propagation in Serial-Transport Block-Coded Interfaces", U.S. Appl. No. 09/534,108, filed Mar. 23, 2000.

"HOTLink™ Transmitter/Receiver", CY7B923 CY7B933, Cypress Semiconductor Corporation, Apr. 5, 1999, pps. 1-35.

\* cited by examiner

*Primary Examiner*—Stephen Chin
*Assistant Examiner*—Ted M. Wang
(74) *Attorney, Agent, or Firm*—Christopher P. Maiorana, PC

(57) ABSTRACT

An apparatus comprising a first circuit and a second circuit. The first circuit may be configured to generate a first select signal, a second select signal and a first data stream in response to an input data stream and an exception signal. The second circuit may be configured to generate an output data stream in response to the first data stream, the first select signal and the second select signal. The second circuit may be configured to replace one or more characters of the first data stream.

21 Claims, 4 Drawing Sheets

APPARATUS AND PROTOCOL FOR EXCEPTION PROPAGATION IN SERIAL TRANSPORT BLOCK CODED INTERFACES

CROSS-REFERENCE TO RELATED APPLICATION

The present invention may relate to application Ser. No. 09/534,108, filed Mar. 23, 2000, now U.S. Pat. No. 6,886, 126, issued Apr. 26, 2005, which is hereby incorporated by reference in its entirety.

FIELD OF THE INVENTION

The present invention relates to a method and/or architecture for propagating transmit exception information generally and, more particularly, to a method and/or architecture for propagating transmit exception information across a communications channel (e.g., link) that does not normally carry exception information.

BACKGROUND OF THE INVENTION

Conventional methods for detecting and correcting data errors generally attempt to detect and correct such errors by transmitting redundant data. The redundant data is sent across a communications channel that is implemented to validate the data following reception of the data. Examples of conventional redundant data detection/correction systems include cyclic redundancy check (CRC), checksum, and forward error correction (FEC). Since conventional methods operate after reception of the complete data packet or frame construct, such conventional methods induce additional delay into communications channel recovery time when responding to such errors.

For conventional systems that contain error detection at the data source, any character detected as invalid is transmitted as some other valid character. Conventional system designs assume that the conventional link-data protection mechanisms (i.e., PARITY, CRC, FEC, etc.) will detect and properly deal with the error.

All system protection mechanisms that are based only on transport of redundant data can be defeated by specific types of faults or corruptions of the data as the data passes across the link.

SUMMARY OF THE INVENTION

The present invention concerns an apparatus comprising a first circuit and a second circuit. The first circuit may be configured to generate a first select signal, a second select signal and a first data stream in response to an input data stream and an exception signal. The second circuit may be configured to generate an output data stream in response to the first data stream, the first select signal, and the second select signal. The second circuit may be configured to replace one or more characters of the first data stream.

The objects, features and advantages of the present invention include providing an exception protocol that may (i) work in conjunction with all existing forms of link data protection; (ii) provide unambiguous and immediate indication of transmitter exceptions to a system receiver; (iii) allow a transmitter exception condition duration to be communicated to a receiver; (iv) propagate transmit exception information across a link carrying block-coded data; and/or (v) allow the receiver to discard a packet as soon as a transmitter exception is detected, allowing the system to release resources and re-queue to receive a packet.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
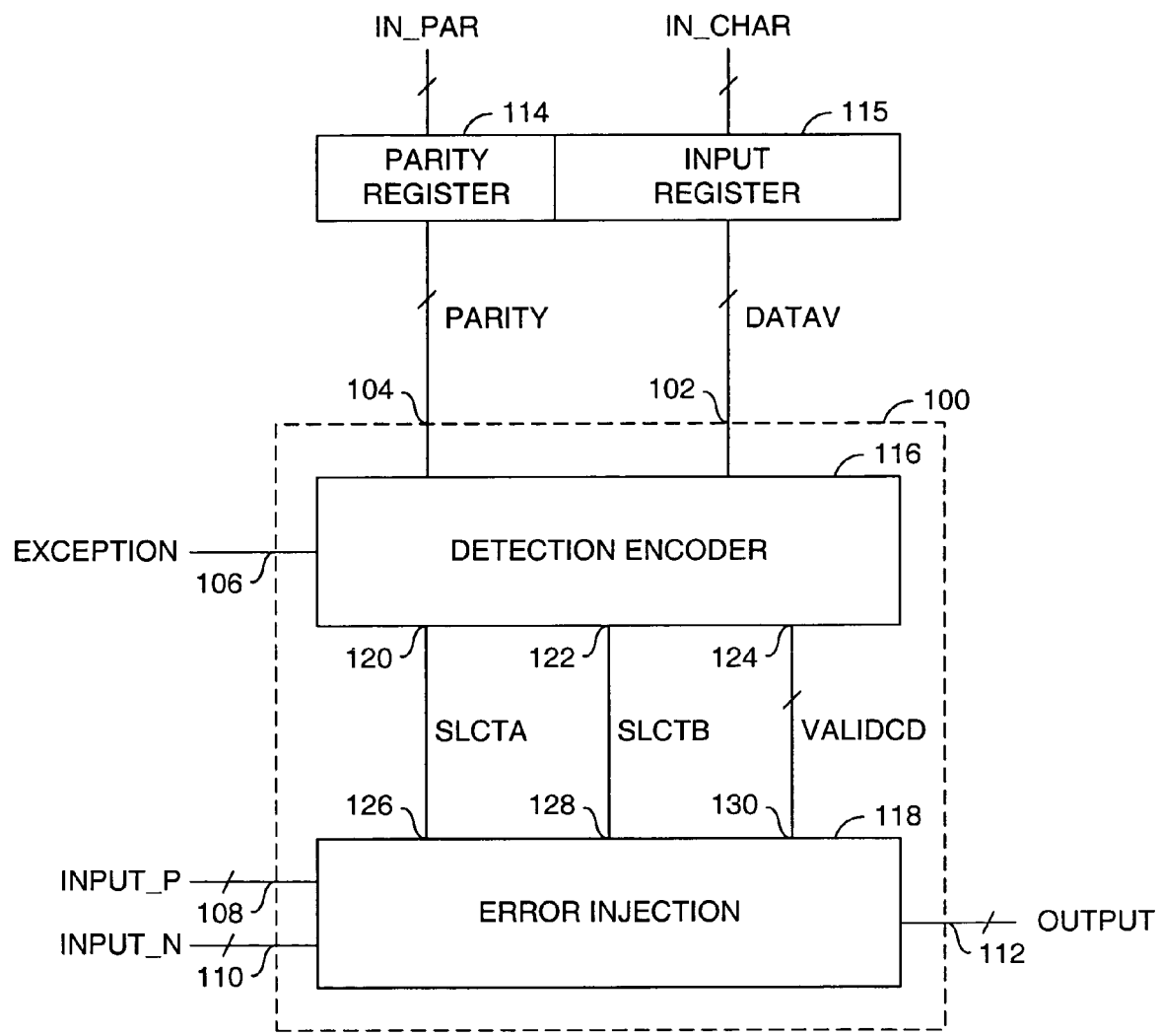
FIG. 1 is a block diagram of a preferred embodiment of the present invention.

Referring to FIG. 1, a block diagram of a circuit 100 is shown in accordance with a preferred embodiment of the present invention. The circuit 100 may be implemented to propagate detection of transmitter exceptions to a remote location across an encoded serial data stream using block-coded characters. The circuit 100 may be implemented without interfering with a normal operation of a protocol. The circuit 100 may be implemented in transmitters that are part of a high-integrity data environment (e.g., banking, financial transactions and/or calculation based systems).

The circuit 100 may be implemented, in one example, as an exception detection/propagation circuit. The circuit 100 may have an input 102 that may receive a data signal (e.g., DATAV), an input 104 that may receive a redundancy signal (e.g., PARITY), an input 106 that may receive an exception signal (e.g., EXCEPTION), an input 108 that may receive a positive disparity character signal (e.g., INPUT_P), an input 110 that may receive a negative disparity character signal (e.g., INPUT_N) and an output 112 that may present an output signal (e.g., OUTPUT). The signal EXCEPTION may be implemented to indicate the existence or occurrence of a transmitter exception condition. An exception condition may be distinguishable from a parity error. An exception condition may be a fault condition or failure in, for example, data handling hardware, while a parity error is generally a fault in the data. In one example, the signal EXCEPTION may be generated in response to an overflow or an underflow condition in a data buffer.

However, the signal EXCEPTION may be generated in response to any hardware or system condition transmission of which over a serial link to a receiver or associated system may be desirable. The signal OUTPUT may be generated in response to the signal DATAV, the signal PARITY, and the signal EXCEPTION.

Each of the signals PARITY, DATAV, INPUT_P, INPUT_N and OUTPUT independently may be a multi-bit signal. In one example, the signals PARITY, DATAV, INPUT_P, INPUT_N and OUTPUT may be n-bits wide, where n is an integer. The signals PARITY, DATAV, INPUT_P, INPUT_N and OUTPUT may be different bit-widths. The circuit 100 may receive the redundancy signal (or bit) PARITY from a register 114 and the signal DATAV from an input register 115.

The circuit 100 may comprise a detection-encoder block (or circuit) 116 and an error injection block (or circuit) 118. In one example, the detection-encoder circuit 116 may be implemented as a transmitter exception detection circuit and the error injection circuit 118 may be implemented as a character propagation circuit. The signals DATAV, EXCEPTION, and PARITY may be presented to inputs of the circuit 116. The signals INPUT_P and INPUT_N may be presented to inputs of the circuit 118. The circuit 116 may have an output 120 that may present a signal (e.g., SLCTA), an output 122 that may present a signal (e.g., SLCTB), and an output 124 that may present a signal (e.g., VALIDCD). The signals SLCTA and SLCTB may be control signals. For example, the signals SLCTA and SLCTB may be used to select an operating mode of the circuit 118. The signal VALIDCD may be a block-coded data character stream. The signal VALIDCD may contain encoded characters that may represent valid character values of a particular protocol. The signals SLCTA, SLCTB, and VALIDCD may be presented to inputs 126, 128, and 130, respectively, of the circuit 118.

Figure 2:
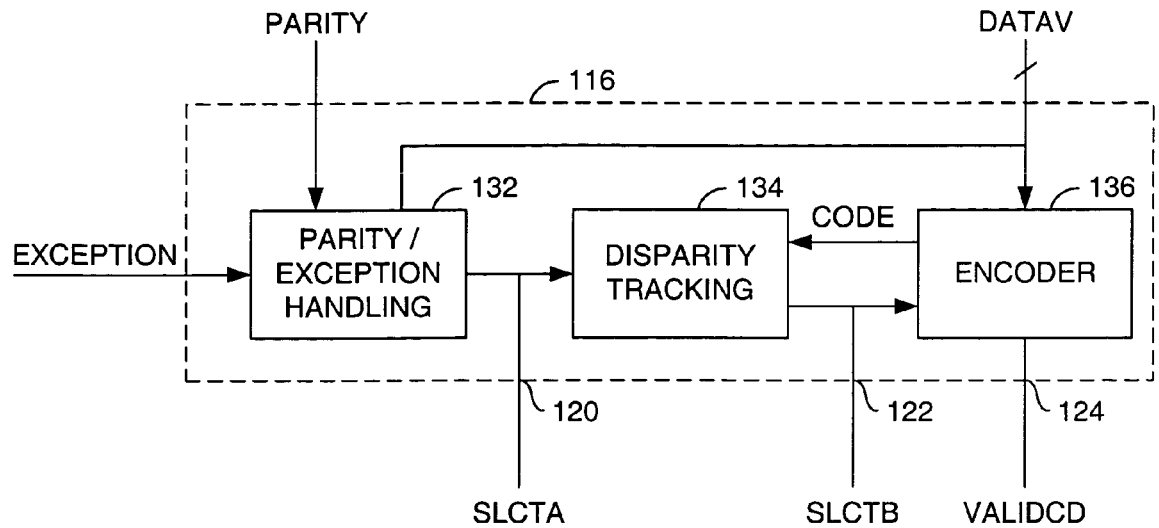
FIG. 2 is a more detailed block diagram illustrating a detection-encoder block of FIG. 1.

Referring to FIG. 2, a more detailed block diagram of the detection-encoder circuit 116 of FIG. 1 is shown. The detection-encoder circuit 116 generally comprises a parity/exception handling block (or circuit) 132, a disparity tracking block (or circuit) 134 and an encoder block (or circuit) 136. The parity/exception handling circuit 132 may be configured to detect transmit exceptions due to a hardware fault, a synchronization error, a software generated interrupt, etc. For example, the parity/exception handling circuit 132 may receive the signal EXCEPTION from a buffer synchronization check circuit (not shown).

The circuit 132 may be configured to generate the signal SLCTA in response to the signal EXCEPTION and/or the signals DATAV and PARITY. The tracking circuit 134 may be configured to generate the signal SLCTB in response to a signal (e.g., CODE) and/or the signal SLCTA. The encoder circuit 136 may be configured to present the signal CODE and the signal VALIDCD in response to the signal DATAV and the signal SLCTB.

Figure 3:
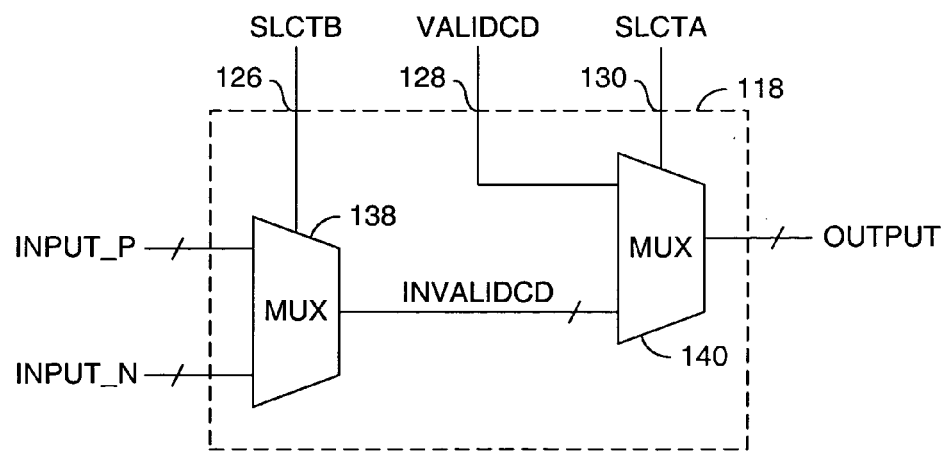
FIG. 3 is a more detailed block diagram illustrating an error injection block of FIG. 1.

Referring to FIG. 3, a more detailed block diagram of the error injection circuit 118 of FIG. 1 is shown. The error injection circuit 118 generally comprises a multiplexer 138 and a multiplexer 140. However, the error injection circuit 118 may be implemented without the multiplexer 138 when implemented for data encoding that does not make use of disparity tracking. The multiplexers 138 and 140 may be implemented, in one example, as an n-bit wide group of 2 to 1 multiplexers, where n is an integer.

However, other appropriate multiplexer circuits may be implemented to meet the design criteria of a particular implementation. The multiplexer 138 may have an output that may present a data signal (e.g., INVALIDCD). The multiplexer 138 may have a control input that may receive the signal SLCTB, a first input that may receive the signal INPUT_P and a second input that may receive the signal INPUT_N. The signals INPUT_P and INPUT_N may, in one example, be implemented as positive and negative disparity encoded character signals, respectively. However, the signals INPUT_P and INPUT_N may each be implemented as other appropriate signals in order to meet the design criteria of a particular implementation. The multiplexer 138 may present the signal INVALIDCD by selecting either the signal INPUT_P or the signal INPUT_N, in response to the signal SLCTB.

The multiplexer 140 may be configured to present the signal OUTPUT. The multiplexer 140 may have a first input that may receive the signal VALIDCD, a second input that may receive the signal INVALIDCD and a control input that may receive the signal SLCTA. The multiplexer 140 may present the signal OUTPUT by selecting either the signal VALIDCD or the signal INVALIDCD, in response to the signal SLCTA.

Figure 4:
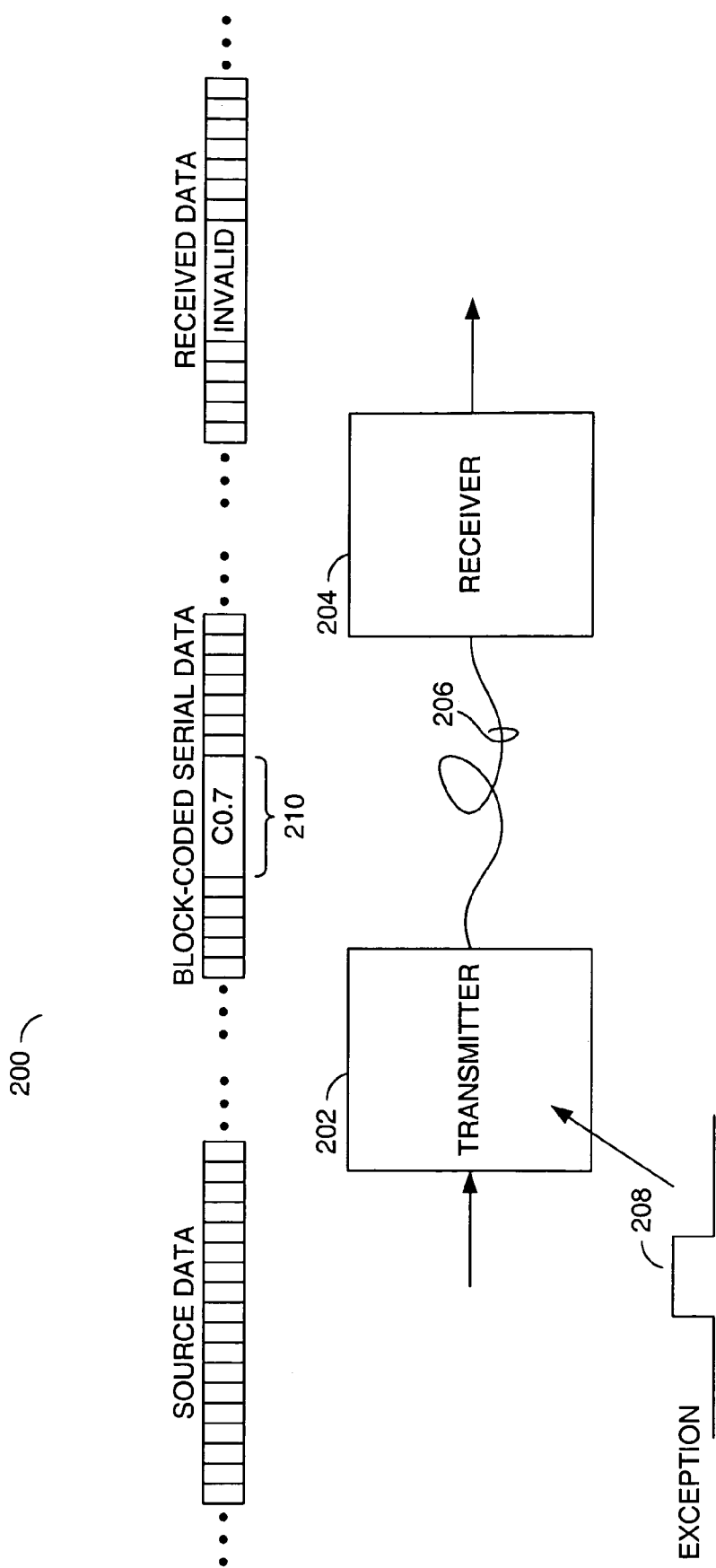
FIG. 4 is a block diagram illustrating an example transmission system in accordance with the present invention.

Referring to FIG. 4, a block diagram of a system 200 is shown in accordance with a preferred embodiment of the present invention. The system 200 generally comprises a transmitter 202 and a receiver 204 coupled by a serial link 206. The system 200 generally comprises a protocol and circuit for signaling hardware (or software) exceptions 208, that may occur upstream from the encoder in a serial transport block-coded system, to the receiver 204 of the system. The exception message 210 may employ block-coded characters without interfering with the normal operation of the protocol.

The present invention may be used to propagate a signal indicating the detection of a transmission exception (e.g., a synchronization failure in a source data stream) to a remote location across the encoded serial data stream 206 using a block-coded character 210. For example, one or more characters of the encoded serial data stream 206 may be replaced with a predetermined character. The predetermined character may be orthogonal to (e.g., outside of) an encoded data and special character set. The character used may be, in one example, an invalid character that is outside the set of all valid data and valid special characters (e.g., the C0.7 character as identified in the CY7B923/CY7B933 datasheet, Cypress Semiconductor Corp., Apr. 5, 1999, which is hereby incorporated by reference in its entirety). However, other characters may be used to meet the design criteria of a particular implementation. The propagated signal generally does not interfere with the normal operation of the protocol. The present invention may be used in applications requiring a high-integrity data environment (e.g., banking and other financial transaction or calculation based systems). The present invention may be limited to use in interfaces where the data is not temporal in nature (e.g., video) and minor data imperfections can be recovered through use of retry or retransmission of the data.

Figure 5:
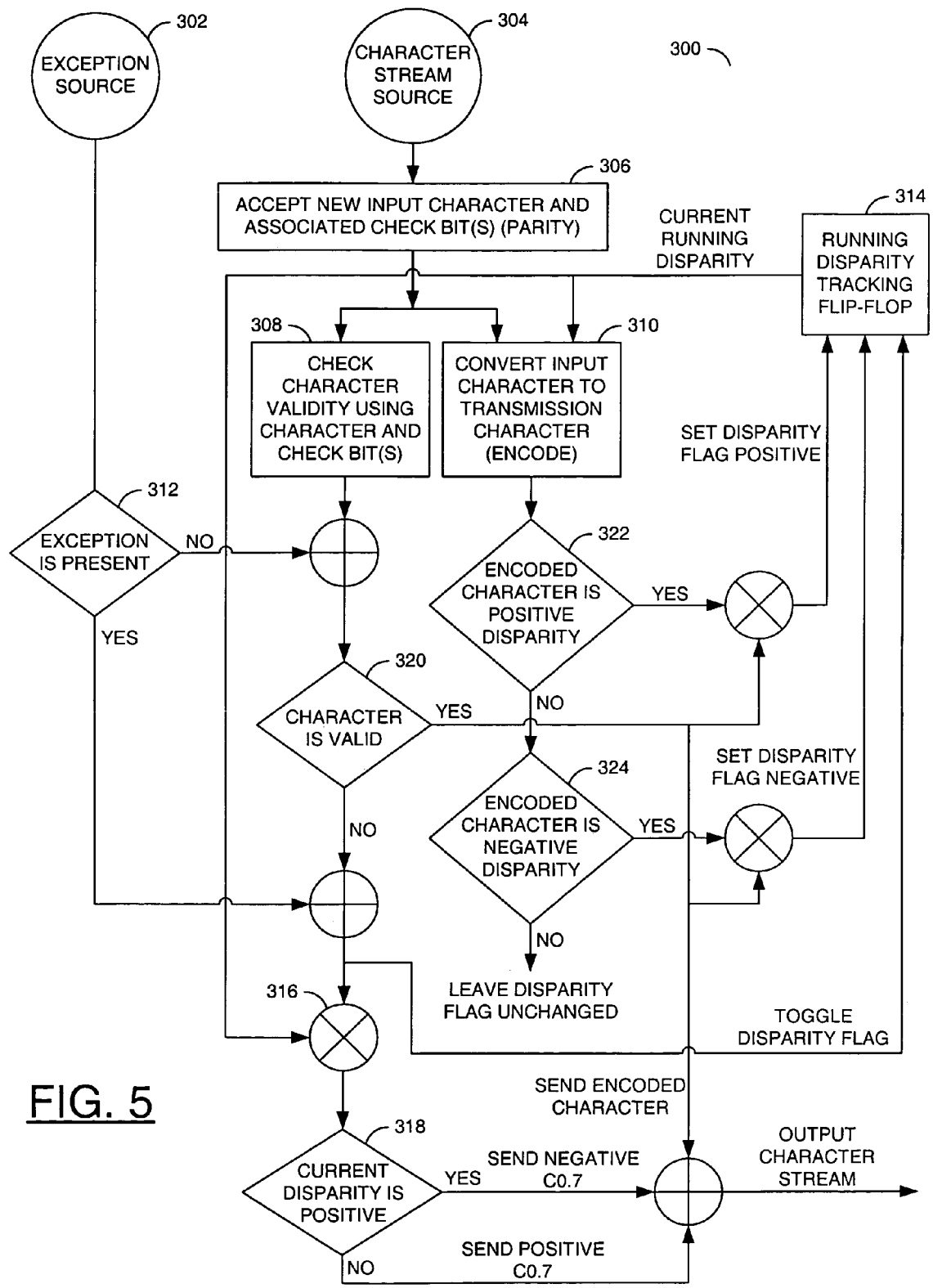
FIG. 5 is a flow diagram illustrating an example operation of the present invention.

Referring to FIG. 5, a flow diagram 300 illustrating an example operation of a preferred embodiment of the present invention is shown. The flow diagram 300 may illustrate transmission exception handling as well as character validity checking of a data stream using character bits and check bits. The transmission exception handling portion may be implemented without the character validity checking portion. The present invention may receive an EXCEPTION signal (e.g., exception detect block 302) and a data stream (e.g., character stream source block 304). The new input character and associated check bits may be accepted (e.g., the block 306). The character validity may be checked using character and check bits (e.g., the block 308) and the input character converted to a transmission character (e.g., the block 310).

The present invention may check to see whether a transmit exception is present (e.g., the decision block 312). When an exception is present, the exception check block 312 may present a toggle disparity flag signal. The toggle disparity flag signal may be presented to a running disparity tracking flip-flop 314. In response to an exception being present, the exception checking block 312 may also present a signal to an AND function 316. The AND function may logically combine the transmit exception signal from the check block 312 with the current running disparity from the disparity tracking flip-flop 314. The combined transmit exception signal and current running disparity may be used to send a predetermined character (e.g., a positive or negative disparity C.07 character) to signal existence of the transmit exception (e.g., the decision block 318). As long as the transmit exception is present, the predetermined character with the correct disparity will generally be sent.

When an exception is not present and a redundancy check is not implemented, the encoded character will generally be sent. When a redundancy check is implemented, the input character may be checked to see whether the character is valid or not (e.g., the block 320). When the input character is valid, the check block 320 may present a send encoded character signal. When the input character is invalid, the check block 320 may present a toggle disparity flag signal. The toggle disparity flag signal may be presented to a running disparity tracking flip-flop 314. When the input character is invalid, the check block 320 may also present a signal to the AND function 316. The AND function may logically combine the character invalid signal from the check block 320 with the current running disparity from the disparity tracking flip-flop 314.

A determination may be made whether an encoded output from the encoder 310 has a positive disparity (e.g., the block 322). When the encoded output has a positive disparity, and the character validity check block 320 indicates that the character is valid, a set disparity flag positive signal may be generated. The set disparity flag positive signal may be presented to the running disparity tracking flip-flop 314. The set disparity flag positive signal may set the disparity tracking flip-flop 314.

When the encoded output does not have positive disparity, a determination may be made whether the encoded character has negative disparity (e.g., the block 324). When the encoded character has negative disparity, and the character validity check block 320 indicates that the character is valid, a set disparity flag negative signal may be generated. The set disparity flag negative signal may be presented to the running disparity tracking flip-flop 314. The set disparity flag negative signal may clear the disparity tracking flip-flop 314. When the encoded output does not have a negative disparity, the character may be neutral and no signal is generally presented to the disparity tracking flip-flop 314. When the encoded output does not have a negative disparity, the current state of the disparity tracking flip-flop 314 generally remains unchanged.

The running disparity tracking block 314 may present the current running disparity signal. The current running disparity signal (flag) is generally presented to the character encoder function 310 and the AND function 316. An output of the AND function 316 may be presented to a check block 318. The check block 318 may determine whether the current disparity is positive or negative. When the current disparity is positive, the check block 318 may present a negative disparity invalid character (e.g., negative C0.7). When the current disparity is negative the check block 318 may present a positive disparity invalid character (e.g., positive C0.7). The positive and/or negative disparity invalid character(s) may be presented to an output character stream. Additionally, a send encoded character signal may be sent when there is no transmit exception and the check block 320, if implemented, determines that the input character is valid. When the send encoded character signal is presented, the output character stream may receive the encoded character from the encoder block 310. The output character stream may be presented in response to the positive and/or negative disparity character(s), the encoded character generated by the encoder block 310, and the check blocks 312 and 320.

The present invention may be configured to present a series of predetermined invalid characters (e.g., C0.7) or alternate special characters to communicate the existence and duration of hardware (or software) exceptions across a block-coded serial link. The present invention may operate completely at the transmit side 202 of the communications channel. A data buffering feature may be incorporated into the transmit function. The buffering feature may allow the phase and/or frequency of a source data stream to be decoupled from the transmit function. A transmission exception (e.g., synchronization failure) may occur, in one example, when the buffering capacity of the data buffer is exceeded. The transmission exception may cause characters to be added or dropped from the data stream, corrupting the transmitted character stream.

When a transmission exception occurs, the transmission of valid characters may be replaced at the output of the encoder with a transmission character that will not be recognized at the remote receiver as a valid character (e.g., the C0.7 character). The character may be transmitted continuously until such time as the transmission exception is cleared from the transmit data buffer.

To prevent corruption of any characters in the data stream DATAV following the exception, the C0.7 character or other selected character may be presented in either a positive disparity form (e.g., the signal INPUT_P) or a negative disparity form (e.g., the signal INPUT_N). The proper disparity version of the C0.7 character may be presented as the signal OUTPUT throughout the duration of the transmission exception. Sending the C0.7 character throughout the duration of the transmission exception may limit error propagation to only the duration of the transmission exception (e.g., a synchronization error condition), plus any characters that are corrupted as part of the normal link transmission. In general, no additional characters will be detected as corrupt due to the encoding of the characters at the transmitter (e.g., the signal OUTPUT).

The C0.7 character may be encoded in either (i) a first encoded form 011000 0111 (e.g., the positive disparity signal INPUT_P) or (ii) a second encoded form 100111 1000 (e.g., the negative disparity signal INPUT_N). The first encoded form is generally transmitted if the current running disparity is negative when the exception is detected and/or transmitted. The second encoded form is generally transmitted if the current running disparity is positive when the exception is detected and/or transmitted.

The present invention may be configured to detect other types of error exceptions at the transmit end of the interface and/or present alternative characters in the serial stream upon detection of the error exception at the transmitter. In one example, the present invention may make use of a synchronization failure of a data buffer as the transmit exception cause for communicating the exception character. However, any hardware or software condition of arbitrary duration and clearing mechanism may be employed accordingly. For example, the present invention may propagate transmit exceptions due to hardware faults, software generated interrupts, or any other failure that may affect transmitter function.

The present invention may be implemented in conjunction with all existing forms of communications channel data protection to allow transmitter exception conditions to be communicated to the receiver. Alternatively, the present invention may modify the specific non-data character used to replace the invalid data when sent across the communications channel. The present invention generally does not implement a normal data character to replace the invalid data (since all the normal data characters are presently implemented for normal transportation). Furthermore, the replacement character is not generally one of the special character codes used for transport of normal protocol information. Within standardized protocols (e.g., ANSI/NCITS X3.230-1994 Fibre Channel, ESCON, or IEEE 802.3z Gigabit Ethernet) and their use of the 8B/10B code for data transport, not all of the twelve available non-data characters are used by the protocol. Such an implementation may allow one of the available non-data characters to be implemented to transport the detection of invalid data or invalid non-data characters used by the protocol.

When the circuit 100 is implemented with user-defined protocols, all the non-data characters that are normally part of the character set may be allocated to the transport protocol. Such an implementation generally requires the allocation of an invalid character in the encoded character space (e.g., an invalid transmission character) to convey the detection of an invalid data or non-data character in the non-encoded domain. Since the encoded character space may be quite large, the specific character selected is generally not critical. However, for encoding formats that operate with disparity tracking, the character must generally be available in two disparity forms to prevent expansion of a single character error at the source into two or more characters in error at the receiver.

The selection of a character outside the normal data and non-data character space may not limit the error detection or reporting capabilities of the interface. When an exception is detected at the transmitter and the selected invalid transmission character is sent, the local transmitter generally has knowledge that an exception was detected. When the communications channel receiver detects the presence of the invalid character in the encoded character space (e.g., an invalid transmission character) the receipt of the invalid character may be communicated back to the source to assist in exception handling.

The present invention may provide the ability to propagate transmitter exception information across a communications channel carrying block-coded data. The receiver may be configured to discard the packet as soon as the invalid character is detected, allowing the system to release resources and re-queue the packet for retransmission. The present invention may also provide the ability to transport and maintain running-disparity integrity in the presence of a transmitter exception. If the data stream is disrupted at a transmitter without control of running disparity, the reception of a character in error may cause adjacent characters to also be detected in error.

The present invention may be of importance to those data transport environments that cannot tolerate an undetected data error. Such environments are most prominent in enterprise data storage implementations where all data paths must carry either parity or some other form of error detection/protection. Detection and propagation capability may be of considerable importance in many commercial applications.

The function performed by the circuit 100 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMS, EPROMs, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a first circuit configured to generate a first select signal, a second select signal and a first data stream in response to an input data stream and an exception signal; and
a second circuit configured to generate an output data stream in response to said first data stream, said first select signal and said second select signal, wherein said second circuit is configured to replace one or more characters of said first data stream with a predetermined invalid transmission character in response to said first select signal, wherein said second circuit comprises a first multiplexer configured to (i) multiplex said first data stream and an error injection path in response to said first select signal to present said output data stream and (ii) generate said output data stream in response to a first and a second disparity signal.

2. The apparatus according to claim 1, wherein said exception signal comprises a transmitter exception signal.

3. The apparatus according to claim 1, wherein said second circuit is configured to replace said one or more characters with said predetermined invalid transmission character to indicate (i) an exception condition is present and (ii) a duration of said exception condition in a transmission station.

4. The apparatus according to claim 3, wherein said predetermined invalid transmission character indicates an exception condition selected from the group consisting of a hardware fault, a synchronization failure, and a software generated interrupt of a transmission function.

5. The apparatus according to claim 1, wherein said second circuit is further configured to present said predetermined invalid transmission character as either (i) a positive disparity character or (ii) a negative disparity character, in response to said first and said second select signals.

6. The apparatus according to claim 5, wherein said second circuit selects and/or transmits (i) said positive disparity character when a current running disparity is negative and (ii) said negative disparity character when the current running disparity is positive.

7. The apparatus according to claim 1, wherein said first circuit comprises a detection-encoder circuit and said second circuit comprises an error injection circuit.

8. The apparatus according to claim 4, wherein said first circuit comprises (i) a detection circuit configured to present said first select signal in response to said exception condition, (ii) a tracking circuit configured to present said second select signal in response to said first select signal and a code signal and (iii) an encoder circuit configured to present said first data stream and said code signal in response to said second select signal and said input data stream.

9. The apparatus according to claim 8, wherein said detection circuit is further configured to indicate a duration of said exception condition.

10. An apparatus comprising:
- means for generating a first select signal, a second select signal and a first data stream in response to an input data stream and an exception signal;
- means for generating an output data stream in response to said first data stream, said first select signal and said second select signal; and
- means for replacing one or more characters of said first data stream with a predetermined invalid transmission character, wherein said means for generating an output data stream comprises a first multiplexer configured to (i) multiplex said first data stream and an error injection path in response to said first select signal to present said output data stream and (ii) generate said output data stream in response to a first and a second disparity signal.

11. A method for propagating transmitter exceptions comprising the steps of:
  (A) detecting a transmitter exception; and
  (B) replacing one or more characters of a data stream with a predetermined character, wherein said predetermined character is orthogonal to an encoded data and special character set.

12. The method according to claim 11, further comprising the step of:
  (C) presenting said predetermined character with either a positive or a negative disparity.

13. The method according to claim 12, wherein step (C) further comprises selecting and transmitting (i) said positive disparity form when a current running disparity is negative or (ii) said negative disparity form when said current running disparity is positive.

14. The method according to claim 11, wherein step (A) further comprises detecting a hardware fault, a synchronization failure, or a software generated interrupt of a transmitter function.

15. The method according to claim 11, wherein step (B) is repeated for a duration of said transmitter exception.

16. A method for propagating transmitter exceptions comprising the steps of:
  (A) detecting a transmitter exception;
  (B) replacing one or more characters of a data stream with a predetermined invalid transmission character; and
  (C) presenting said predetermined invalid transmission character with either a positive or a negative disparity.

17. An apparatus comprising:
- a first circuit configured to generate a first select signal, a second select signal and a first data stream in response to an input data stream and an exception signal; and
- a second circuit configured to generate an output data stream in response to said first data stream, said first select signal and said second select signal, wherein said second circuit is configured to (i) replace one or more characters of said first data stream with a predetermined invalid transmission character to indicate the presence and duration of an exception condition in a transmission station and (ii) present said predetermined invalid transmission character as either (a) a positive disparity character or (b) a negative disparity character, in response to said first and second select signals.

18. The apparatus according to claim 17, wherein said second circuit comprises a first multiplexer configured to multiplex said first data stream and an error injection path in response to said first select signal to present said output data stream.

19. The apparatus according to claim 18, wherein said second circuit is further configured to generate said output data stream in response to a first and a second disparity signal.

20. The apparatus according to claim 19, wherein said second circuit further comprises a second multiplexer configured to multiplex said first and second disparity signals in response to said second select signal and present said error injection path.

21. The apparatus according to claim 20, wherein said output of said second multiplexer comprises an invalid data stream and said first data stream comprises a valid data stream.

* * * * *

UNITED STATES PATENT AND TRADEMARK OFFICE
CERTIFICATE OF CORRECTION

PATENT NO. : 7,016,430 B1 Page 1 of 1
APPLICATION NO. : 09/814194
DATED : March 21, 2006
INVENTOR(S) : Edward L. Grivna et al.

It is certified that error appears in the above-identified patent and that said Letters Patent is hereby corrected as shown below:

<u>Title page</u>
Item [73] Assignee:
Replace "Cyrpess Semiconductor Corp., San Jose, CA (US)" with -- Cypress Semiconductor Corp., San Jose, CA (US) --

Signed and Sealed this

Twelfth Day of December, 2006

JON W. DUDAS
*Director of the United States Patent and Trademark Office*